(12) United States Patent
Namikiri et al.

(10) Patent No.: US 9,777,614 B2
(45) Date of Patent: Oct. 3, 2017

(54) METHOD FOR INSTALLING INLET PIPE AND METHOD FOR SUPPORTING INLET PIPE

(71) Applicant: Futaba Industrial Co., Ltd., Aichi (JP)

(72) Inventors: Toshikazu Namikiri, Aichi (JP); Takamitsu Kaneko, Aichi (JP); Katsuhiko Kainuma, Aichi (JP); Masashi Sugiura, Aichi (JP); Noboru Shimizu, Aichi (JP); Masafumi Wada, Aichi (JP); Daisuke Izumikawa, Aichi (JP); Seigo Kawasue, Aichi (JP); Tetsufumi Watanabe, Aichi (JP)

(73) Assignee: Futaba Industrial Co., Ltd., Aichi (JP)

( * ) Notice: Subject to any disclaimer, the term of this patent is extended or adjusted under 35 U.S.C. 154(b) by 172 days.

(21) Appl. No.: 14/760,461

(22) PCT Filed: Jan. 10, 2014

(86) PCT No.: PCT/JP2014/050338
§ 371 (c)(1),
(2) Date: Jul. 10, 2015

(87) PCT Pub. No.: WO2014/109389
PCT Pub. Date: Jul. 17, 2014

(65) Prior Publication Data
US 2015/0354433 A1    Dec. 10, 2015

(30) Foreign Application Priority Data

Jan. 11, 2013  (JP) .................. 2013-003707

(51) Int. Cl.
*F01N 13/18* (2010.01)
*F01N 1/08* (2006.01)
*F01N 1/02* (2006.01)

(52) U.S. Cl.
CPC ......... *F01N 13/1805* (2013.01); *F01N 1/02* (2013.01); *F01N 1/089* (2013.01); *F01N 13/18* (2013.01);
(Continued)

(58) Field of Classification Search
CPC .......... B60Y 2304/07; B60Y 2304/072; B60Y 2304/074; B23P 11/00; B23P 2700/50;
(Continued)

(56) References Cited

U.S. PATENT DOCUMENTS 5,756,945 A * 5/1998 Maeda ............... F02M 35/1283
                                                          181/229
8,292,026 B2 * 10/2012 Tauschek .................. F01N 1/08
                                                          181/212
(Continued)

FOREIGN PATENT DOCUMENTS

| CN | 202000428 | 10/2011 |
| JP | 2001082142 | 3/2001 |
| JP | 200616995 A | 1/2006 |
| JP | 200831888 A | 2/2008 |
| JP | 2008274767 | 11/2008 |
| JP | 2010138807 A | 6/2010 |

OTHER PUBLICATIONS

International Search Report in corresponding PCT application PCT/JP2014/050338 (i.e., Form PCT/ISA/210), mailed Apr. 8, 2014 (3 pages).
(Continued)

*Primary Examiner* — Christopher Besler
*Assistant Examiner* — Matthew P Travers
(74) *Attorney, Agent, or Firm* — Renner, Otto, Boisselle & Sklar, LLP

(57) ABSTRACT

A disposing method for an inlet pipe in a muffler that includes an outer shell, an inlet pipe, and a separating plate, the disposing method comprising: a first step of inserting the inlet pipe into the outer shell from an opening at one end of the outer shell; a second step of disposing the inlet pipe by moving the inlet pipe within the outer shell in a direction substantially orthogonal to the direction of insertion of the inlet pipe; and a third step of disposing the separating plate by inserting the separating plate into the outer shell from the opening at the other end of the outer shell.

6 Claims, 6 Drawing Sheets

(52) U.S. Cl.
CPC ...... *F01N 13/1844* (2013.01); *B60Y 2304/07* (2013.01); *F01N 2470/18* (2013.01); *F01N 2490/02* (2013.01); *Y10T 29/49398* (2015.01)

(58) Field of Classification Search
CPC ......... Y10T 29/49826; Y10T 29/49904; Y10T 29/53974; Y10T 29/49398; F01N 13/18; F01N 13/1805; F01N 2450/00; F01N 2450/22; F01N 13/1844; F01N 2470/18
USPC .................................. 181/269, 272, 238, 239
See application file for complete search history.

(56) References Cited

U.S. PATENT DOCUMENTS

| | | | | |
|---|---|---|---|---|
| 2002/0104215 | A1* | 8/2002 | Tokunaga | B23P 15/26 29/890.038 |
| 2014/0116801 | A1* | 5/2014 | Andre | F01N 1/10 181/213 |

OTHER PUBLICATIONS

English Translation of International Preliminary Report on Patentability in PCT/JP2014/050338 (Form PCT/IPEA/409)(3 pages); Notification of Transmittal of International Preliminary Report on Patentability in PCT/JP2014/050338, Jul. 16, 2015 (Form PCT/IPEA/409)(1 page); and International Preliminary Report on Patentability in PCT/JP2014/050338 (Form PCT/IPEA/409)(8 pages in Japanese language).

Partial English Translation, i.e. of Section V, of Written Opinion of the International Searching Authority in PCT/JP2014/050338 (Form PCT/ISA/237)(1 page); and Written Opinion of the International Search Authority in PCT/JP2014/050338 (Form PCT/ISA/237)(4 pages in Japanese language).

Office Action dated Feb. 4, 2017 for corresponding Chinese patent application No. 201480004608X, with English Language translation.

* cited by examiner

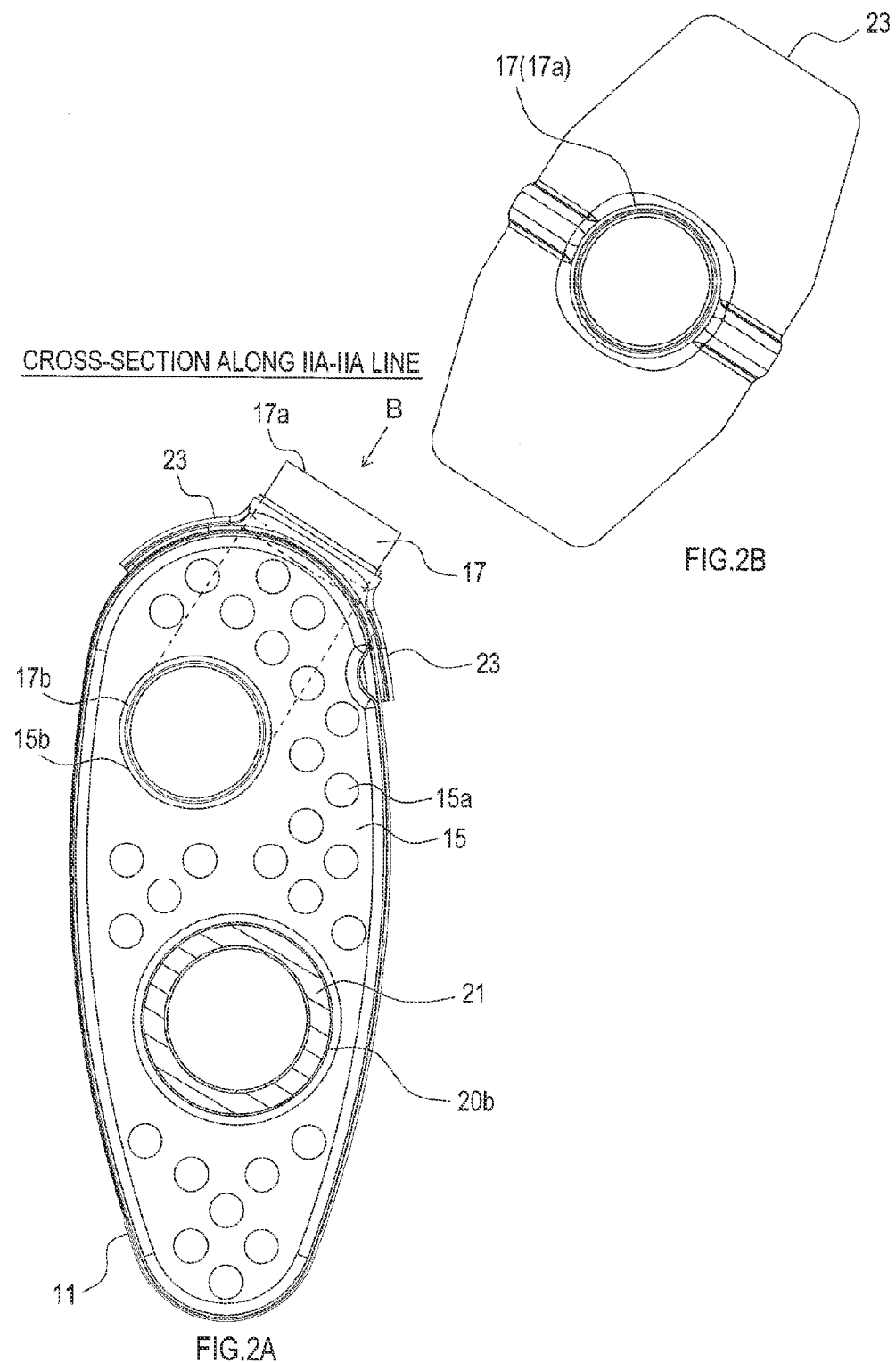

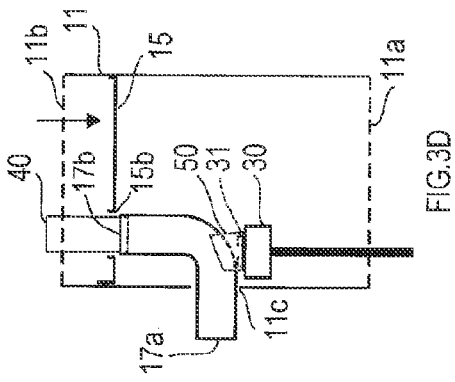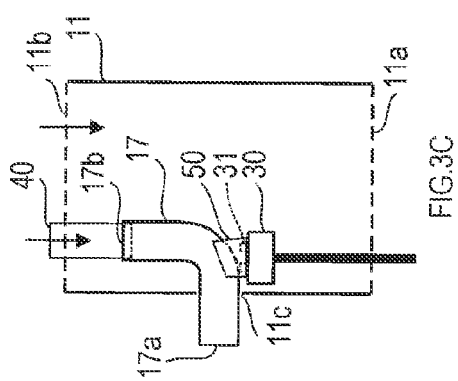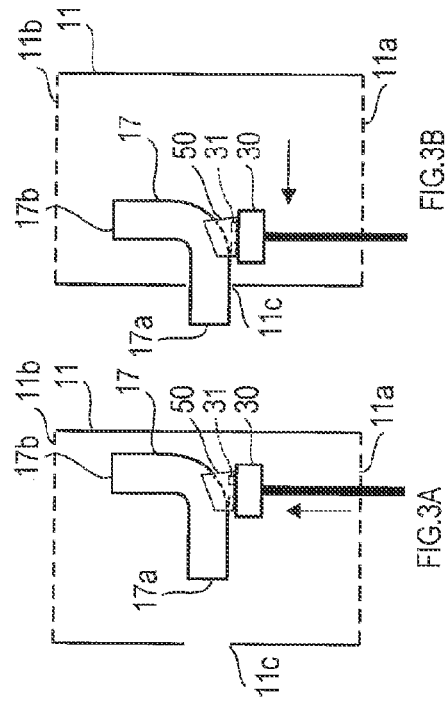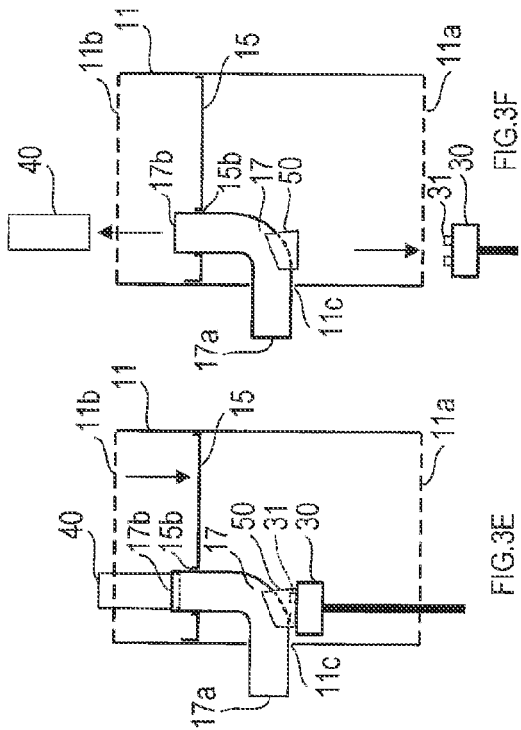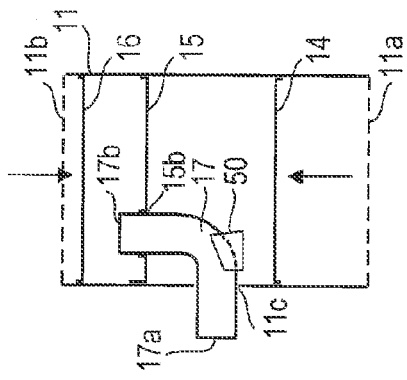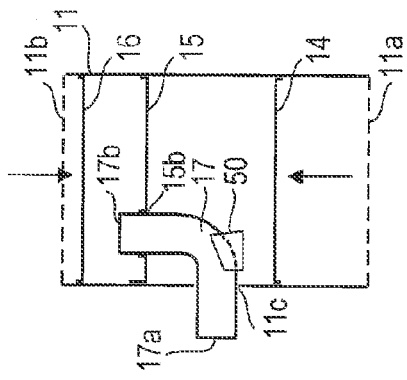

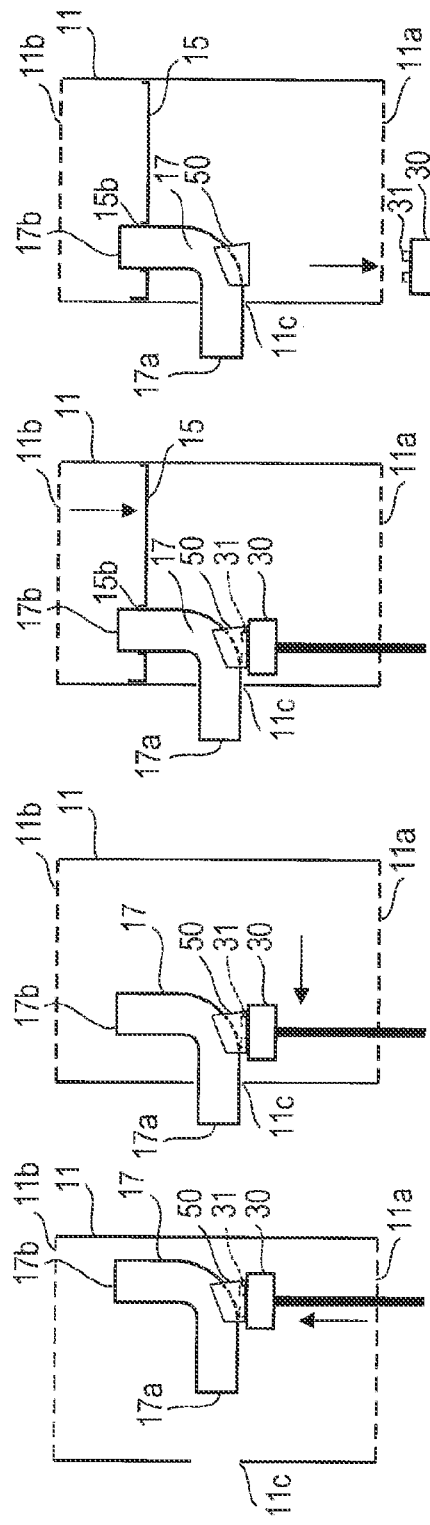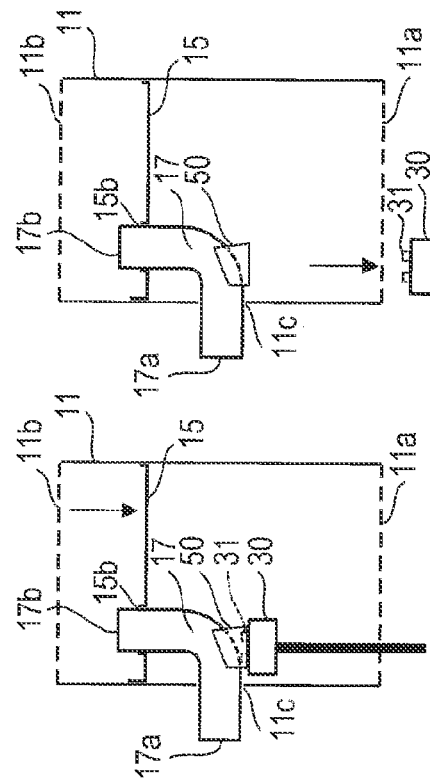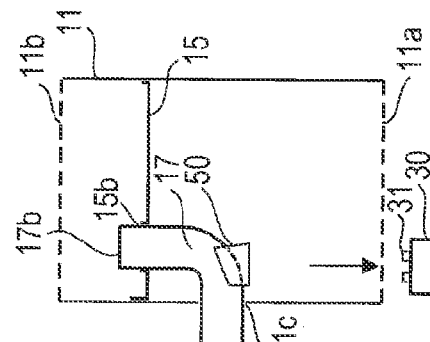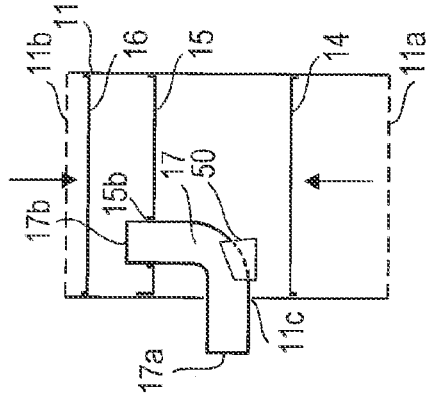

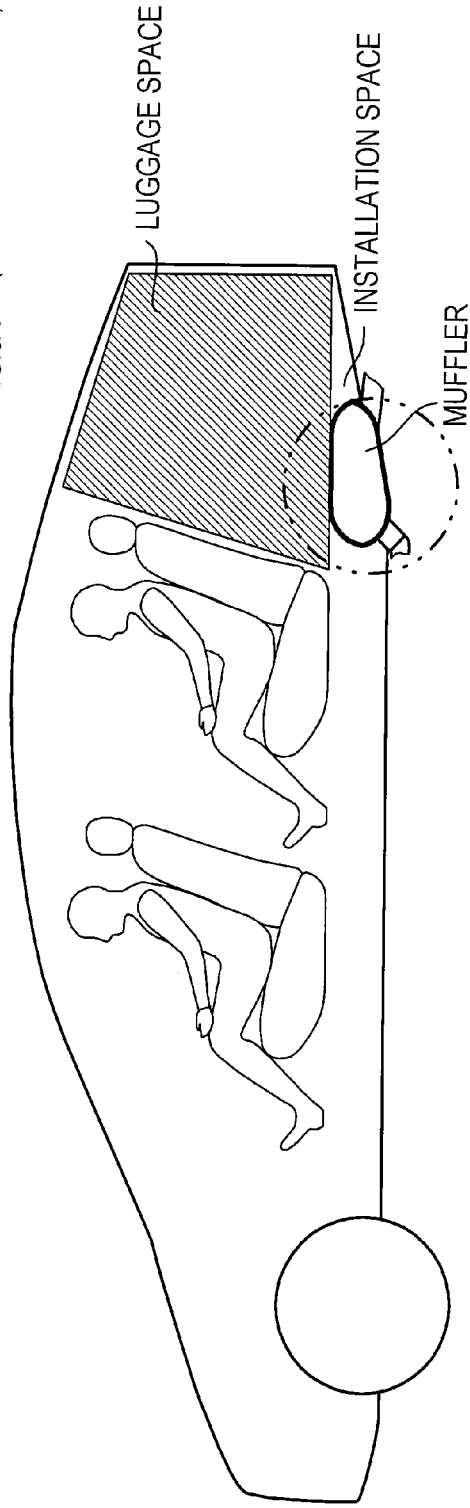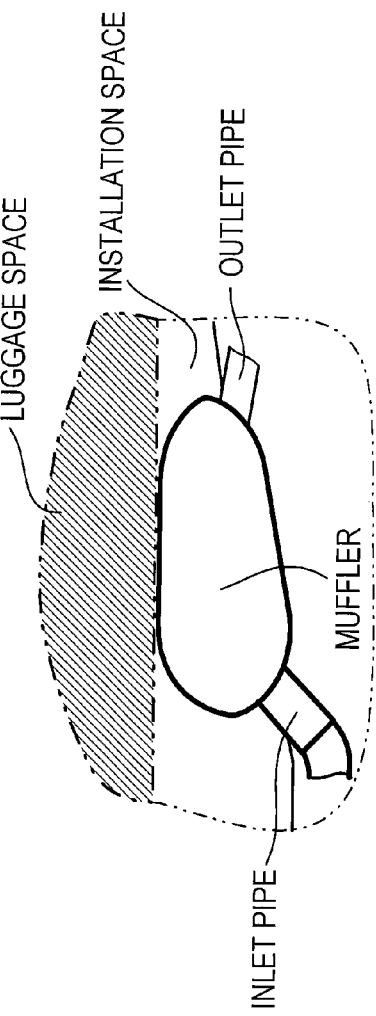

METHOD FOR INSTALLING INLET PIPE AND METHOD FOR SUPPORTING INLET PIPE

CROSS-REFERENCE TO RELATED APPLICATIONS

This international application claims the benefit of Japanese Patent Application No. 2013-003707 filed Jan. 11, 2013 in the Japan Patent Office, and the entire disclosure of Japanese Patent Application No. 2013-003707 is incorporated herein by reference.

TECHNICAL FIELD

The present invention relates to a disposing method and supporting method for an inlet pipe in the muffler of a vehicle.

BACKGROUND ART

A vehicle is provided with a muffler for reducing or deadening exhaust noise of exhaust gas from an internal combustion engine (e.g., Patent Documents 1 to 3, and see FIGS. 6A, 6B in this application).

A muffler of this type includes: a cylindrical outer shell of flat cross-section; end plates closing openings at both ends of the outer shell; an inlet pipe for introducing exhaust gas into the outer shell; separating plates for sectioning the inside of the outer shell, thereby defining a plurality of muffling chambers; and an outlet pipe for expelling exhaust gas out of the outer shell from inside it.

A muffler described in Patent Document 1 is a so-called longitudinally-mounted type muffler, in which the direction of the long axis of the outer shell extends along the forward and backward directions of the vehicle. A straight inlet pipe is disposed along the direction of the long axis of the outer shell and through an end plate and separating plates (see FIG. 1 in Patent Document 1).

Meanwhile, laterally-mounted type mufflers as disclosed in Patent Documents 2, 3 have been developed due to the limits of muffler installation space. A muffler of this type is disposed such that the direction of the long axis of the outer shell extends along the direction of the vehicle width (i.e., such that the direction of the short axis of the outer shell extends along the forward and backward directions of the vehicle). Because of this, the inlet pipe is generally inserted into the outer shell from the direction of the short axis of the outer shell (see FIGS. 1, 2 in Patent Document 2, and FIG. 1 in Patent Document 3).

FIG. 6A is an overall view showing an installation example of a muffler (e.g., a laterally-mounted type muffler), and FIG. 6B is an enlarged view of the installed portion of the muffler. The vehicle shown in FIGS. 6A, 6B is of sedan type. In a vehicle of this type, a muffler is generally disposed below luggage space in the rear of the vehicle. Generally, since an internal combustion engine is disposed in the front area of the vehicle, the inlet pipe projects in the frontward direction of the vehicle along the direction of the short axis of the muffler.

PRIOR ART DOCUMENTS

Patent Documents

Patent Document 1: Japanese Unexamined Patent Application Publication No. 2008-274767

Patent Document 2: Japanese Unexamined Patent Application Publication No. 2008-31888

Patent Document 2: Japanese Unexamined Patent Application Publication No. 2010-138807

SUMMARY OF THE INVENTION

Problems to be Solved by the Invention

In the longitudinally-mounted type muffler in Patent Document 1, by virtue of its structure, the straight inlet can be supported through both the end plate and separated plate and, accordingly, sufficiently rigid support can easily be ensured.

Meanwhile, in laterally-mounted type mufflers in Patent Documents 2, 3, the inlet pipe projects out from the direction of the short axis of the outer shell. In this case, assuming that a straight inlet pipe is used, the inlet pipe is disposed in parallel with separating plates within the outer shell. Therefore, the inlet pipe cannot be disposed through the separating plates. Hence, the inlet pipe is supported only by the insertion portions of the outer shell, through which this pipe is inserted. In this case, a decrease in rigid support is a threat. To cope with this drawback, Patent Documents 2, 3 use an approximately L-curved inlet pipe such that the inlet pipe is inserted through the outer shell and separating plates.

In this case, however, the holes of the outer shell through which the inlet pipe is inserted, and the holes of the separating plates through which the inlet pipe is inserted, are not located on a straight line. Inserting the inlet pipe later makes it impossible or extremely difficult to fit them together.

Furthermore, in recent years, limits to muffler installation space has becoming stricter, as shown in FIGS. 6A, 6B, also restricting fitting of the inlet pipe to the outer shell. For example, the wider the luggage space ensured, the narrower the space below the luggage space becomes. Because of this, the muffler installation space and hence the shape of the outer shell are limited, making it more difficult to fit the inlet to the outer shell.

It is desirable to provide a so-called laterally-mounted type muffler with a method for securely disposing and supporting an inlet pipe more easily.

Means for Solving the Problems

One aspect of the present invention provides a disposing method for an inlet pipe in a muffler that includes a cylindrical outer shell both ends of which are open, an approximately L-shaped inlet pipe for introducing exhaust gas into the outer shell, and a separating plate for sectioning the inside of the outer shell, thereby defining a plurality of muffling chambers, the disposing method comprising: a first step of inserting the inlet pipe into the outer shell along a direction from an opening at one end of the outer shell to an opening at the other end; a second step of disposing the inlet pipe by moving the inlet pipe within the outer shell in a direction substantially orthogonal to the direction of insertion of the inlet pipe such that one end of the inlet pipe is inserted through an opening provided in a side wall of the outer shell; and a third step of disposing the separating plate by inserting the separating plate into the outer shell from the opening at the other end of the outer shell such that the other end of the inlet pipe is inserted through an opening provided in the separating plate.

According to such an aspect of the invention, after the inlet pipe is positioned such that one end of the inlet pipe is inserted through the opening provided in the side wall of the outer shell, the separating plate is inserted in the outer shell, and the other end of the inlet pipe is inserted through the opening provided in the separating plate. Thereby, the inlet pipe can be supported in two places: one in the outer shell and the other in the separating plate. Accordingly, sufficiently rigid support for the inlet pipe can be ensured.

Additionally, the opening provided in the side wall of the outer shell and the opening provided in the separating plate are not on a straight line, making it impossible or extremely difficult to insert the inlet pipe later. However, in this aspect of the invention, after one end of the inlet pipe is inserted through the opening of the outer shell, the separating plate is inserted in the outer shell such that the other end of the inlet pipe is inserted through the opening of the separating plate. Accordingly, the inlet pipe can easily and securely be disposed and supported. By virtue of this, the muffler can be manufactured without increasing number of man hours or decreasing its quality.

Incidentally, in the first step, the inlet pipe and the outer shell may be moved relatively such that the inlet pipe is disposed in the outer shell. In the second step, the inlet pipe and the outer shell may be moved relatively such that the inlet pipe is disposed in a required place. In one example, instead of the inlet pipe, the outer shell may be moved, or both the inlet pipe and outer shell may be moved.

In the third step, the separating plate and a unit including the inlet pipe and outer shell may be moved relatively such that the other end of the inlet pipe is inserted thorough the opening provided in the separating plate. In one example, the unit including the inlet pipe and outer shell may be moved instead of the separating plate, or both the unit and separating plate may be moved.

In another aspect of the invention, the first step may include a step of fixing the inlet pipe to a jig for supporting the inlet pipe, and a step of inserting the jig with the inlet pipe fixed thereto, into the outer shell. The second step may include a step of disposing the inlet pipe by moving the jig with the inlet pipe fixed thereto.

By using the jig to dispose the inlet pipe in this way, the inlet pipe can be disposed more easily. Specifically, operation (movement) of the jig may be controlled. Accordingly, the inlet pipe can be fitted in a shorter time by virtue of control of the jig.

Incidentally, in the first step, the outer shell and the jig with the inlet pipe fixed thereto may be moved relatively such that the inlet pipe is disposed in the outer shell. In the second step, the outer shell and the jig with the inlet pipe fixed thereto have to be moved relatively such that the inlet pipe is disposed in a required place. In one example, the outer shell may be moved instead of the jig, or both the jig and the outer shell may be moved.

In another aspect of the present invention, the third step includes a step of inserting a cylindrical guide member from the other opening of the outer shell so as to engage with the other end of the inlet pipe, and a step of inserting the guide member through the opening of the separating plate, and inserting the separating plate into the outer shell along the guide member.

By virtue of this, the separating plate can be disposed in a required position via the guide member more easily and securely. Specifically, simply by moving the separating plate such that the guide member is kept inserted through the opening of the separating plate, the separating plate can be moved up to the position where the other end of the inlet pipe is inserted through the separating plate.

In the third step, the guide member and the unit including the outer shell and inlet pipe may be moved relatively such that the guide member engages with the other end of the inlet pipe. In one example, instead of the guide member, the unit including the outer shell and inlet pipe may be moved, or both the unit and guide member may be moved.

Alternatively, the separating plate and the unit including the outer shell, inlet pipe, and guide member may be moved relatively such that the separating plate is disposed in a required position. In one example, instead of the separating plate, the unit may be moved, or both the unit and separating plate may be moved.

In another aspect of the present invention, the first step may include a step of inserting, while the other end of the inlet pipe faces the other opening of the outer shell, the inlet pipe into the outer shell until one end of the inlet pipe corresponds to the opening in the side wall of the outer shell. In such a step, the inlet pipe is first positioned in the direction of insertion in the outer shell, thus making subsequent processes easier. Specifically, when the one end of the inlet pipe corresponds to the opening in the side wall of the outer shell, the inlet pipe may be moved straight such that the one end is inserted through the opening of the side wall of the outer shell. In this way, the process is made easier In the first step, the inlet pipe and outer shell may be moved relatively. In one example, instead of the inlet pipe, the outer shell may be moved, or both the inlet pipe and outer shell may be moved.

In another aspect of the present invention, the second step may include a step of moving straight, while one end of the inlet pipe corresponds to the opening in the side wall of the outer shell, the inlet pipe such that the one end of the inlet pipe moves toward the opening.

By virtue of this, as described above, movement of the inlet pipe is simple, thus making it possible to easily fit the inlet pipe.

In the second step, the inlet pipe and outer shell may be moved relatively. In one example, instead of the inlet pipe, the outer shell may be moved, or both the inlet pipe and outer shell may be moved.

Another aspect of the present invention provides a supporting method for an inlet pipe in a muffler that includes a cylindrical outer shell both ends of which are open, an approximately L-shaped inlet pipe for introducing exhaust gas into the outer shell, and a separating plate for sectioning the inside of the outer shell, thereby defining a plurality of muffling chambers, the supporting method comprising: disposing the inlet pipe such that one end of the inlet pipe is inserted through an opening provided in a side wall of the outer shell, and disposing the separating plate such that the other end of the inlet pipe is inserted through an opening provided in the separating plate, thereby supporting both the ends of the inlet pipe by means of the outer shell and the separating plate.

According to such an aspect of the present invention, the inlet pipe can be supported in two places: one in an opening provided in the side wall of the outer shell, and the other in an opening provided in the separate plate. Accordingly, sufficiently rigid support for the inlet pipe can be ensured.

BRIEF DESCRIPTION OF THE DRAWINGS

FIG. 2A is a sectional view taken along the line IIA-IIA in FIG. 1.

FIG. 2B is a perspective view of a portion B in FIG. 2A

FIGS. 3A to 3G illustrate a disposing method for an inlet pipe.

FIGS. 5A to 5E illustrate a disposing method according to a second embodiment.

FIGS. 6A, 6B show an example of muffler installation.

EXPLANATION OF REFERENCE NUMERALS

10 . . . muffler, 11 . . . outer shell, 12, 13 . . . end plate, 14, 15, 16 . . . separating plate, 17 . . . inlet pipe, 18 . . . inner pipe, 19 . . . outlet pipe, 20a . . . pipe, 20b . . . sound-absorbing cover, 21 . . . glass wool, 22 . . . valve assembly, 30 . . . jig, 31 . . . positioning pin, 32 . . . clamp, 32a . . . leading end part, 40 . . . guide member, 50 . . . bracket, 51 . . . positioning hole, 52 . . . bottom part, R1, R2, R3, R4 . . . muffling chamber

MODE FOR CARRYING OUT THE INVENTION

First Embodiment

Figure 1:
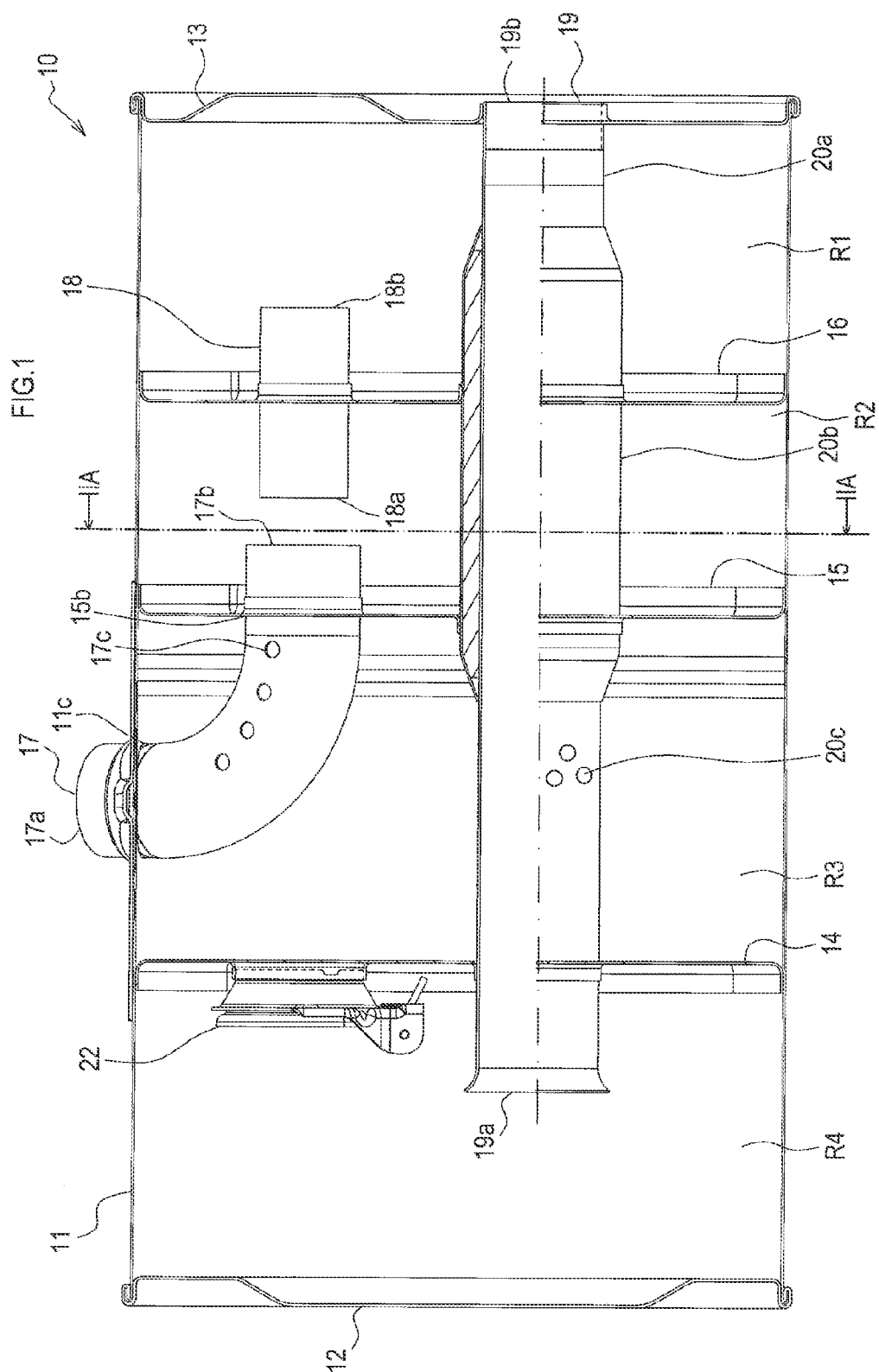
FIG. 1 is a schematic view of a muffler in which the present invention is applied.

A muffler 10 shown in FIG. 1 composes part of an exhaust system by which exhaust gas from an internal combustion engine (not shown) mounted in a vehicle is expelled from the vehicle, and has the function of reducing exhaust noise.

The muffler 10 includes an outer shell 11, end plates 12, 13, separating plates 14, 15, 16, an inlet pipe 17, an inner pipe 18, an output pipe 19, and a valve assembly 22.

An outer shell 11 is a member composing the body of the muffler 10, and has a cylindrical shape of flat cross-section (see FIG. 2A). Both ends of the outer shell 11 itself are open.

The end plates 12, 13 are members for closing the openings at both ends of the outer shell 11. Formed in the end plate 13 is an opening for inserting the outlet pipe 19.

The separating plates 14, 15, 16 are plates for dividing the internal space of the outer shell 11 into a plurality of spaces (hereinafter referred to as muffling chambers). In the first Embodiment, the internal space of the outer shell 11 is divided in four muffling chambers, R1, R2, R3, R4, by the separating plates 14, 15, 16. Among the separating plates 14, 15, 16, the valve assembly 22 is attached to the separating plate 14. The valve assembly 22 will be described later.

Among the separating plates 14, 15, 16, a plurality of holes 15a are formed in the separating plate 15 (see FIG. 2A). Therefore, exhaust gas that has flowed in the muffling chambers R2, R3 via the inlet pipe 17 is able to flow into the muffling chambers R2, R3 via the holes 15a of the separating plate 15.

The inlet pipe 17 is a pipe for causing exhaust gas from the internal combustion chamber of the vehicle to flow into the outer shell 11. In the first embodiment, the inlet pipe 17 has the form of an approximate L-shape, and both ends of this pipe are open. Of the two ends of the inlet pipe 17, one end 17a projecting out of the outer shell 11 is connected to an exhaust pipe (not shown) composing the exhaust system.

The other end 17b of the inlet pipe 17 communicates with the inside of the outer shell 11. Specifically, the other end 17b of the inlet pipe 17 communicates with the muffling chamber R2 while being supported by the separating plate 15. The pipe wall of the inlet pipe 17 has a plurality of holes 17c. Exhaust gas is allowed to diffuse into the outer shell 11 (i.e., into the muffling chamber R3) also through the holes 17c.

In the first embodiment, a bracket 50 (see FIG. 4), described below, is attached to the inlet pipe 17 by means of welding; however, the bracket 50 is not shown in FIG. 1.

The inner pipe 18 is a pipe by which exhaust gas flowing into the outer shell 11 via the inlet pipe 17 is diffused into the muffling chambers. Both ends of the inner pipe 19 are open. One end 18a of the inner pipe 18 communicates with the muffling chamber R2; and the other end 18b thereof, the muffling chamber R1. The inner pipe 18 is inserted through an opening in the separating plate 16 and supported by the separating plate 16.

The outlet pipe 19 is a pipe by which exhaust gas that has flowed in the outer shell 11 from the internal combustion engine is expelled from the outer shell 11. One end 19a of the outlet pipe 19 communicates with the muffling chamber R4. The other end 19b thereof is inserted through an opening in the end plate 13 and communicates with the outside of the outer shell 11.

The outlet pipe 19 has a pipe 20a and sound-absorbing cover 20b. Holes 20c are formed in the pipe 20a. Glass wool 21, serving as a sound-absorbing material, is provided in the sound-absorbing cover 20b.

The valve assembly 22 is a valve that opens/closes according to pressure in the outer shell 11. The valve assembly 22 is closed when the number of revolutions of the internal combustion engine is low and pressure in the outer shell 11 is lower than a predetermined value. In this case, exhaust gas is expelled without its being passed through the muffling chamber R4 communicating with one end 19a of the outlet pipe 19. Conversely, when the number of revolutions of the internal combustion engine increases and pressure in the outer shell 11 becomes equal to or higher than the predetermined value, the valve assembly 22 opens. In this case, exhaust gas flows also into the muffling chamber R4 communicating with the one end 19a of the outlet pipe 19, and is expelled also via the muffling chamber R4.

Referring to FIGS. 2A, 2B, the disposition of the inlet pipe 17 will be described in more detail.

As shown in FIG. 2A, the outer shell 11 has a flat cross-section. The respective curvatures of curved parts in two places of the flat cross-section are not identical. Curvature on the side where the inlet pipe 17 is disposed is relatively large, and that on the side where the outlet pipe is disposed is relatively small.

The inlet pipe 17 is disposed such that one end 17a is inserted from the curved portion of the flat cross-section and at an angle to the outer shell 11. The inlet pipe 17 is welded to the outer shell 11 via a patch 23, which is a member for ensuring the thickness required for the welding. As shown in FIG. 2B, the patch 23 is disposed so as to surround the one end 17a of the inlet pipe 17.

Next, a method for disposing the inlet pipe 17 will be described with reference to FIGS. 3A to 3G. In FIGS. 3A to 3G, the inner pipe 18 and the outlet pipe 19 are not shown.

Referring to FIG. 3A, a description will be given. An approximately L-shaped inlet pipe 17 prepared is fixed to a jig 30 for supporting the inlet pipe 17. A bracket 50 for fixing the inlet pipe 17 to the jig 30 is welded to the inlet pipe 17 in advance.

Figure 4:
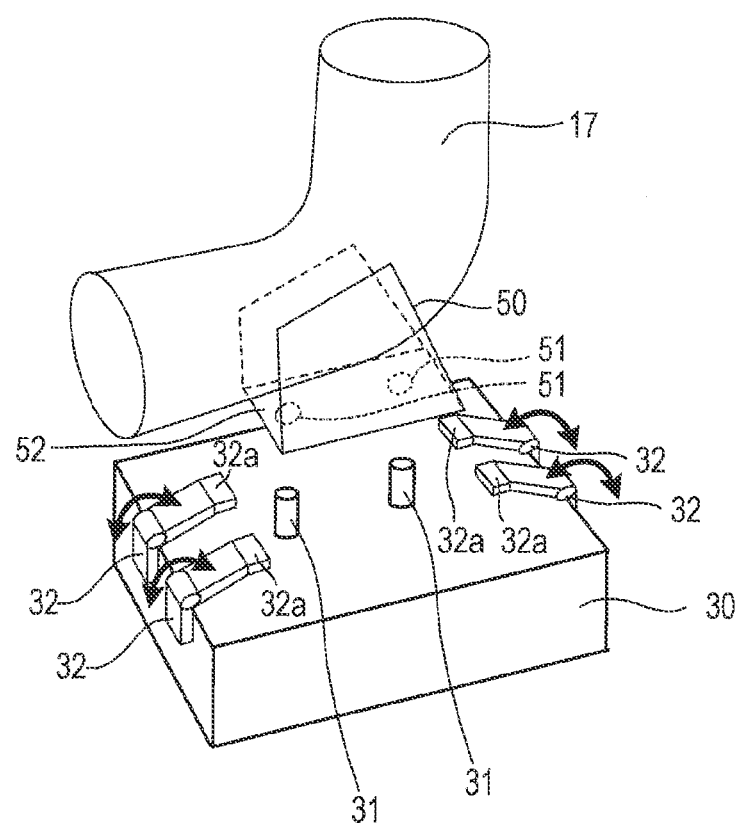
FIG. 4 illustrates a fixing method for the inlet pipe to a jig.

A positioning method and fixing method for the inlet pipe 17 to the jig 30 will be described in detail with reference to FIG. 4.

In the first embodiment, two positioning pins 31 are provided on the jig 30. Positioning holes 51 are formed in the bracket 50 in two places so as to correspond to the positioning pins 31.

The positioning pins 31 are inserted into the positioning holes 51 of the bracket 50, thereby positioning the inlet pipe 17 with respect to the jig 30.

The jig 30 is provided with clamps 32 for clamping the bracket 50. The clamps 32 may freely be opened or closed. When the inlet pipe 17 is positioned with respect to the jig 30, the clamps 32 are open, enabling the bracket 50 to be brought close to the jig 30.

When the positioning pins 31 are inserted into the positioning holes 51, the clamps 32 are closed, so that the leading end parts 32a of the clamps 32 can be in contact with the bottom part 52 of the bracket 51. Thus, the bracket 50 and hence the inlet pipe 17 are fixed to the jig 30. In one example, the opening/closing of the clamps 32 is controlled by a cylinder.

Referring back to FIG. 3A, the jig 30 with the inlet pipe 17 fixed thereto is inserted into the outer shell 11 from one opening 11a of the outer shell 11. At this time, the jig 30 moves such that one end 17b of the inlet pipe 17 is oriented in the direction of an opening 11c (i.e., an opening 11c through which the inlet pipe 17 is to be inserted) formed in the outer shell 11 and the other end 17b of the inlet pipe 17 is oriented in the other opening 11b of the outer shell 11.

The inlet pipe 17 moves via the jig 30 up to the position where the one end 17a of the inlet pipe 17 finally corresponds to the opening 11c of the outer shell 11. In the step shown in FIG. 3A, the inlet pipe 17 is positioned in the direction of the long axis of the outer shell 11.

Next, as shown in FIG. 3B, the inlet pipe 17 moves via the jig 30 relatively parallel (i.e., moves straight) such that the one end 17a of the inlet pipe 17 is inserted into the opening 11c of the outer shell 11. At this time, the jig 30 moves parallel in the direction of the short axis of the outer shell 11. In the step shown in FIG. 3B, the inlet pipe 17 is positioned in the direction of the short axis of the outer shell 11.

Next, as shown in FIG. 3C, while the inlet pipe 17 is fixed to the jig 30, a cylindrical guide member 40 is inserted from the opening 11b of the outer shell 11. The guide member 40 is inserted until it engages with the other end 17b of the inlet pipe 17. The guide member 40 engages with the inside-diameter part of the inlet pipe 17. The guide member 40 may be formed so as to engage with the outside-diameter part of the inlet pipe 17.

Next, as shown in FIG. 3D, a separating plate 15 is inserted from the opening 11b of the outer shell 11 into the outer shell 11 along the guide member 40. An opening 15b through which the inlet pipe 17 is to be inserted is formed in the separating plate 15. The opening 15b of the separating plate 15 fits on the other end 17b of the inlet pipe 17, thereby positioning the inlet pipe 17.

Then, as shown in FIG. 3E, the separating plate 15 is inserted in the outer shell 11 finally up to the position where the other end 17b of the inlet pipe 17 is inserted through the opening 15b formed in the separating plate 15.

Next, as shown in FIG. 3F, the jig 30 and guide member 40 are detached from the inlet pipe 17 and taken out of the outer shell 11.

Thereafter, as shown in FIG. 3G, the separating plates 14, 16 are disposed in the outer shell 11. Although not shown in FIGS. 3A to 3G, the inner pipe 18, outlet pipe 19, and so on are also disposed after disposition of the inlet pipe 17. Then, the openings 11a, 11b of the outer shell 11 are closed by the end plates 12, 13.

According to the first embodiment as described above, the inlet pipe 17 can be supported in two places: the opening 11c of the outer shell 11, and the opening 15b of the separating plate 15. Accordingly, rigid support for the inlet pipe 17 can be ensured.

The inlet pipe 17 is curved approximately in an L-shape in order to be supported in two places as described above. Because of this, it is impossible or extremely difficult to insert the inlet pipe 17 into both the outer shell 11 and separating plate 15 later. Meanwhile, the first embodiment employs a method in which one end 17a of the inlet pipe 17 is first inserted through the opening 11c of the outer shell 11 and thereby positioned, thereafter, the separating plate 15 is inserted in the outer shell 11, and the other end 17b of the inlet pipe 17 is inserted through the opening 15b of the separated plate 15.

By virtue of this, fitting of the inlet pipe 17 is facilitated and ensured. Accordingly, a high quality muffler can easily be manufactured without increasing number of man-hours.

Modified Example of First Embodiment

In the first embodiment described above, it is assumed that the jig 30 with the inlet pipe 17 fixed thereto, the guide member 40, and the separating plates 14, 15, 16, are moved with respect to the outer shell 11. That is, the position of the outer shell 11 is assumed to be fixed.

However, the position of the outer shell 11 need not be fixed. The inlet pipe 17 and separating plates 14, 15, 16 may be disposed by moving the outer shell 11. In this case, these members may be moved relative to one another. Only the outer shell 11 may be moved or each member may be moved.

In FIG. 3A, the outer shell 11 may be moved such that the jig 30 with the inlet pipe 17 fixed thereto is disposed within the outer shell 11.

Next, in FIG. 3B, the outer shell 11 may be moved such that the one end 17a of the inlet pipe 17 is inserted through the opening 11c of the outer shell 11.

Then, in FIG. 3C, the inlet pipe 17, jig 30, and outer shell 11 may be moved such that the guide member 40 engages with the other end 17b of the inlet pipe 17. In this case, the jig 30 with the inlet pipe 17 fixed thereto and the outer shell 11 are moved synchronously (simultaneously). Specifically, they are made identical in degree by which each of them is moved and speed at which each is moved.

Subsequently, in FIGS. 3D, 3E, the inlet pipe 17, jig 30, guide member 40, and outer shell 11 may be moved such that the separating plate 15 is disposed within the outer shell 11 along the guide member 40.

Next, in FIG. 3F, the outer shell 11 may be moved such that the jig 30 and guide member 40 are detached from the inlet pipe 17. In this case, in one example, the jig 30 may be detached, while keeping it fixed, by moving the other members including the outer shell 11 in a specific manner. Additionally, the guide member 40 may be detached, while keeping it fixed, by moving the other members including the outer shell 11 in a specific manner.

Thereafter, in FIG. 3G, the outer shell 11 may be moved such that the separating plates 14, 16 are disposed within the outer shell 11. Specifically, the separating plates 14, 16 may be disposed within the outer shell 11 by moving the outer shell 11 while keeping the separating plates 14, 16 fixed in specific positions.

Second Embodiment

Next, a second embodiment according to the present invention will be described on the basis of FIGS. 5A to 5E.

The second embodiment differs from the first embodiment in that a guide member 40 is not used.

Specifically, the second embodiment is identical to the first embodiment in that an inlet pipe 17 is positioned and fixed to a jig 30, and the jig 30 is inserted into an outer shell 11 (FIG. 5A) and then the jig 30 is moved parallel such that the one end 17a of the inlet pipe 17 is inserted through the opening 11c of the outer shell 11 (FIG. 5B).

Subsequently, in the second embodiment, as shown in FIG. 5C, a separating plate 15 is inserted into the outer shell 11 from the opening 11b of the outer shell 11 without insertion of a guide member 40, and the other end 17b of the inlet pipe 17 is inserted through the opening 15b of the separating plate 15.

Thereafter, as shown in FIG. 5D, the jig 30 is detached from the inlet pipe 17 and is taken out of the outer shell 11.

Then, separating plates 14, 16 are disposed within the outer shell 11 (FIG. 5E) and, although not shown, an inner pipe 18, outlet pipe 19, and so on, are also disposed within the outer shell 11.

According to the second embodiment as described above, since a guide member 40 is not used, the number of components can be reduced, and the number of assembly steps can also be reduced.

Modified Example of Second Embodiment

In the second embodiment described above, it is assumed that the jig 30 with the inlet pipe 17 fixed thereto, and the separating plates 14, 15, 16, are moved with respect to the outer shell 11. That is, the position of the outer shell 11 is assumed to be fixed.

Meanwhile, the position of the outer shell 11 need not be fixed. The inlet pipe 17 and separating plates 14, 15, 16 may be disposed by moving the outer shell 11.

In this case, these members may be moved relative to one another. Only the outer shell 11 may be moved or each member may be moved.

In FIG. 5A, the outer shell 11 may be moved such that the jig 30 with the inlet pipe 17 fixed thereto is disposed within the outer shell 11.

In FIG. 5B, the outer shell 11 may be moved such that one end 17a of the inlet pipe 17 is inserted through the opening 11c of the outer shell 11.

In FIG. 5C, the outer shell 11 and inlet pipe 17 may be moved such that the separating plate 15 is disposed within the outer shell 11 from the opening 11b of the outer shell 11.

In FIG. 5D, the outer shell 11 may be moved such that the jig 30 is detached from the inlet pipe 17.

Embodiments according to the present invention have been described above. However, the present invention is not limited to the foregoing embodiments, and various forms can be assumed within the technical scope of the present invention.

In the foregoing embodiments, for example, a description is given using an example where the bracket 50 is attached to the inlet pipe 17 and the inlet pipe 17 is positioned and fixed to the jig 30 via the bracket 50. Meanwhile, positioning holes and portions to be secured by clamps 32 may be formed in the inlet pipe 17 itself. Alternatively, some of the holes 17c formed in the lintel pipe 17 may serve as positioning holes as well.

In the foregoing embodiments, a description is given using an example where the number of the clamps 32 provided is four. However, the number of the clamps 32 is not limited to four.

Additionally, in terms of the disposing method for the inlet pipe 17, in the foregoing embodiments, a description is given using an example where, after the inlet pipe 17 is inserted in the outer shell 11 such that one end 17a of the inlet pipe 17 corresponds to the opening 11c of the outer shell 11, the inlet pipe 17 is moved straight such that one end 17a of the inlet pipe 17 is inserted through the opening 11c of the outer shell 11. However, the method for disposing the inlet pipe 17 is not limited to such a method.

For example, while being rotated, the inlet pipe 17 may be moved such that one end 17a of the inlet pipe 17 finally faces the opening 11c of the outer shell 11. Such a method can be adopted, particularly in a case where the opening 11c is eccentric to the outer shell 11 (see, FIG. 2A, for example).

The invention claimed is:

1. A disposing method for an inlet pipe in a muffler that includes a cylindrical outer shell both ends of which are open, an L-shaped inlet pipe for introducing exhaust gas into the outer shell, and a separating plate for sectioning the inside of the outer shell, thereby defining a plurality of muffling chambers, the disposing method comprising:
   a first step of inserting the inlet pipe into the outer shell along a direction from an opening at a first end of the outer shell to an opening at a second end of the outer shell;
   a second step of disposing the inlet pipe by moving the inlet pipe within the outer shell in a direction substantially orthogonal to the direction of insertion of the inlet pipe such that a first end of the inlet pipe is inserted through an opening provided in a side wall of the outer shell; and
   a third step of disposing the separating plate by inserting the separating plate into the outer shell from the opening at the second end of the outer shell such that a second end of the inlet pipe is inserted through an opening provided in the separating plate.

2. The disposing method according to claim 1, wherein the first step includes a step of fixing the inlet pipe to a jig for supporting the inlet pipe thereon, and a step of inserting the jig with the inlet pipe fixed thereto, into the outer shell, and wherein the second step includes a step of disposing the inlet pipe by moving the jig with the inlet pipe fixed thereto.

3. The disposing method according to claim 1, wherein the third step includes a step of inserting a cylindrical guide member from the opening at the second end of the outer shell so as to engage with the second end of the inlet pipe, and a step of inserting the guide member through the opening of the separating plate, and inserting the separating plate into the outer shell along the guide member.

4. The disposing method according to claim 1, wherein the first step includes a step of inserting, while the second end of the inlet pipe faces the opening at the second end of the outer shell, the inlet pipe into the outer shell until the first end of the inlet pipe corresponds to the opening in the side wall of the outer shell.

5. The disposing method according to claim 4, wherein the second step includes a step of moving straight, while the first end of the inlet pipe corresponds to the opening in the side wall of the outer shell, the inlet pipe such that the first end of the inlet pipe moves toward the opening in the side wall of the outer shell.

6. A disposing method for an inlet pipe in a muffler that includes a cylindrical outer shell both ends of which are open, an L-shaped inlet pipe for introducing exhaust gas into the outer shell, and a separating plate for sectioning the inside of the outer shell, thereby defining a plurality of muffling chambers, the disposing method comprising:
   a first step of moving the inlet pipe and the outer shell relatively such that the inlet pipe is inserted into the outer shell along a direction from an opening at a first end of the outer shell to an opening at a second end of the outer shell;

a second step of moving the inlet pipe and the outer shell relatively in a direction substantially orthogonal to the direction of insertion of the inlet pipe such that a first end of the inlet pipe is inserted through an opening provided in a side wall of the outer shell; and a third step of moving the inlet pipe, the outer shell, and the separating plate relatively such that the separating plate is disposed in the outer shell from the opening at the second end of the outer shell and a second end of the inlet pipe is inserted through an opening provided in the separating plate.

* * * * *